US007397349B2

(12) United States Patent
Lahr et al.

(10) Patent No.: US 7,397,349 B2
(45) Date of Patent: Jul. 8, 2008

(54) SYSTEM FOR AUTOMATIC ACTIVATION AND CANCELLATION OF HAZARD LIGHTS ON A VEHICLE

(75) Inventors: Jeremy A. Lahr, Columbia City, IN (US); Allyson K. Kreft, Fort Wayne, IN (US); Douglas R. Taylor, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 204 days.

(21) Appl. No.: 11/289,011

(22) Filed: Nov. 29, 2005

(65) Prior Publication Data

US 2007/0120655 A1 May 31, 2007

(51) Int. Cl.
*B60Q 1/26* (2006.01)
(52) U.S. Cl. ............... 340/433; 340/463; 340/479; 307/9.1
(58) Field of Classification Search .......... 340/433
See application file for complete search history.

(56) References Cited

U.S. PATENT DOCUMENTS

| 2,654,079 | A | * | 9/1953 | Ringwald | 340/471 |
|---|---|---|---|---|---|
| 3,109,158 | A | * | 10/1963 | Coombs | 340/464 |
| 3,182,289 | A | * | 5/1965 | Rossi | 340/433 |
| 3,434,106 | A | * | 3/1969 | Lawless | 340/467 |
| 3,771,122 | A | * | 11/1973 | Sattler | 340/466 |
| 3,829,828 | A | * | 8/1974 | Hutchinson et al. | 340/466 |
| 3,873,968 | A | * | 3/1975 | Baader | 340/433 |
| RE28,479 | E | * | 7/1975 | Suzuki et al. | 340/471 |
| 3,909,780 | A | * | 9/1975 | Huffman | 340/463 |
| 4,559,518 | A | * | 12/1985 | Latta, Jr. | 340/433 |
| 4,916,431 | A | * | 4/1990 | Gearey | 340/479 |
| 5,642,094 | A | * | 6/1997 | Marcella | 340/479 |
| 6,023,221 | A | * | 2/2000 | Michelotti | 340/471 |
| 6,333,687 | B1 | * | 12/2001 | LaBelle | 340/466 |
| 6,396,395 | B1 | * | 5/2002 | Zielinski et al. | 340/425.5 |
| 6,515,584 | B2 | * | 2/2003 | DeYoung | 340/475 |
| 6,580,362 | B1 | * | 6/2003 | Zimmerman et al. | 340/425.5 |
| 6,879,251 | B2 | * | 4/2005 | Robbins et al. | 340/471 |
| 7,236,090 | B2 | * | 6/2007 | Gumbel et al. | 340/468 |

* cited by examiner

*Primary Examiner*—George Bugg
*Assistant Examiner*—Eric M. Blount
(74) *Attorney, Agent, or Firm*—Jeffrey P. Calfa

(57) ABSTRACT

A vehicle lighting control system for a school bus allows automatic activation of hazard mode operation of the vehicle's signaling lights in response to activation of other warning lights. Deactivation follows upon the vehicle exceeding a predetermined maximum speed.

1 Claim, 2 Drawing Sheets

SYSTEM FOR AUTOMATIC ACTIVATION AND CANCELLATION OF HAZARD LIGHTS ON A VEHICLE

BACKGROUND OF THE INVENTION

1. Technical Field

The invention relates to vehicle lighting control and more particularly to a lighting control system providing automatic activation and cancellation of hazard light operation.

2. Description of the Problem

Motorists are alerted to the embarkation and disembarkation of pupils from school busses by the use of dedicated warning lights. The activation of the hazard avoidance feature of the vehicle's turn signal lights can be used to supplement the pupil warning lights. Separate switches have been provided for the warning lights and for hazard operation of the turn signal lights. This arrangement necessitates action by the driver to engage hazard mode operation of the lights and a separate action to cancel hazard mode operation after boarding is completed.

SUMMARY OF THE INVENTION

The invention provides a lighting control system implementing automatic hazard operation of the turn signal lights in conjunction with operation of the pupil warning lights on a school bus. Hazard operation of the turn signal lights is triggered by activation of the pupil warning lights. Hazard operation is canceled by subsequent movement of the bus.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
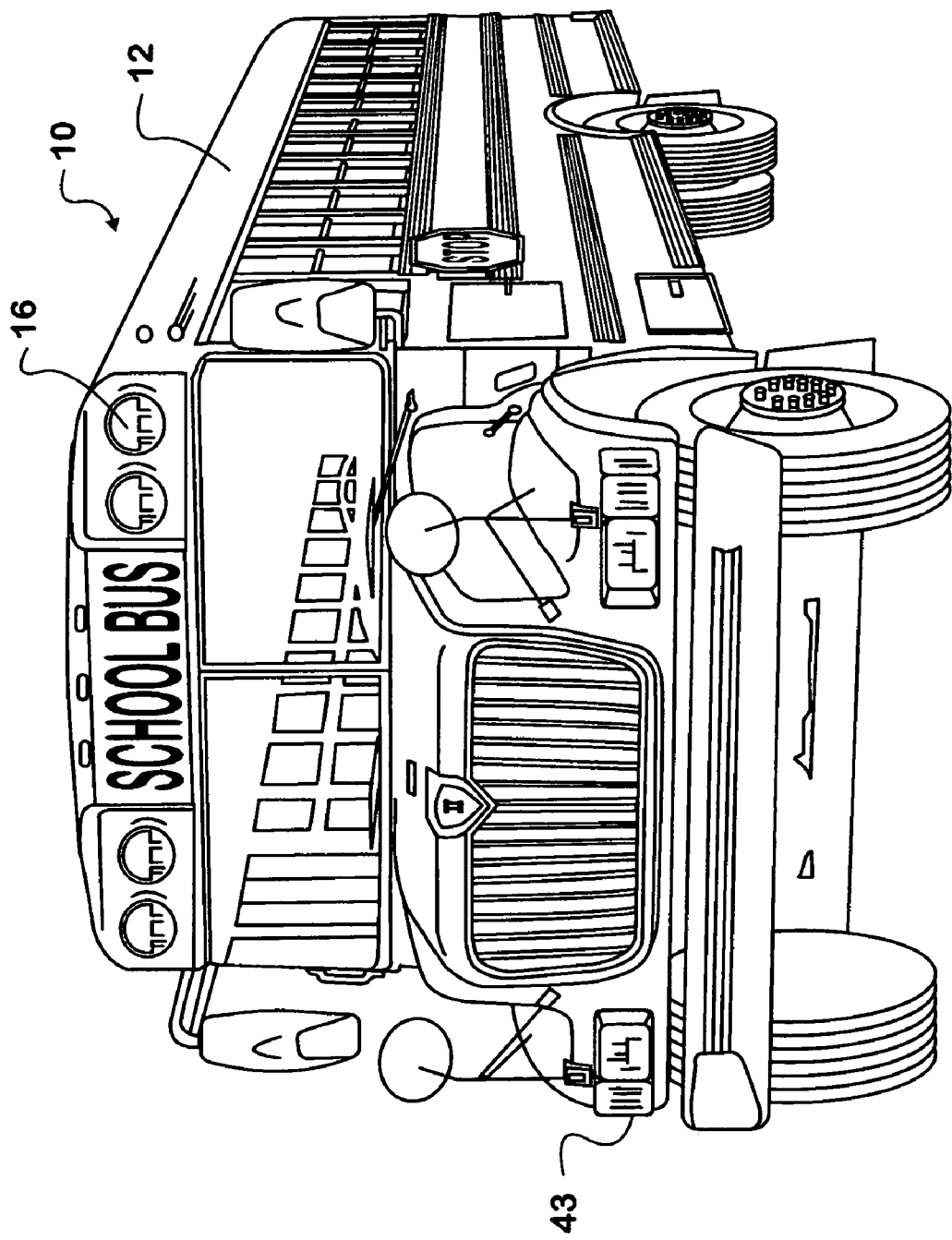
FIG. 1 is a perspective view of a school bus with which the system for control of hazard and pupil warning lights is advantageously used.

Referring now to the figures and in particular to FIG. 1, a vehicle 10 is illustrated. Vehicle 10 includes a school bus body 12 installed on a chassis. School bus body 12 is equipped with conventional exterior lamps including at least pupil boarding warning lights 16 and turn signal lights 43 and 64 (front signals only shown).

Figure 2:
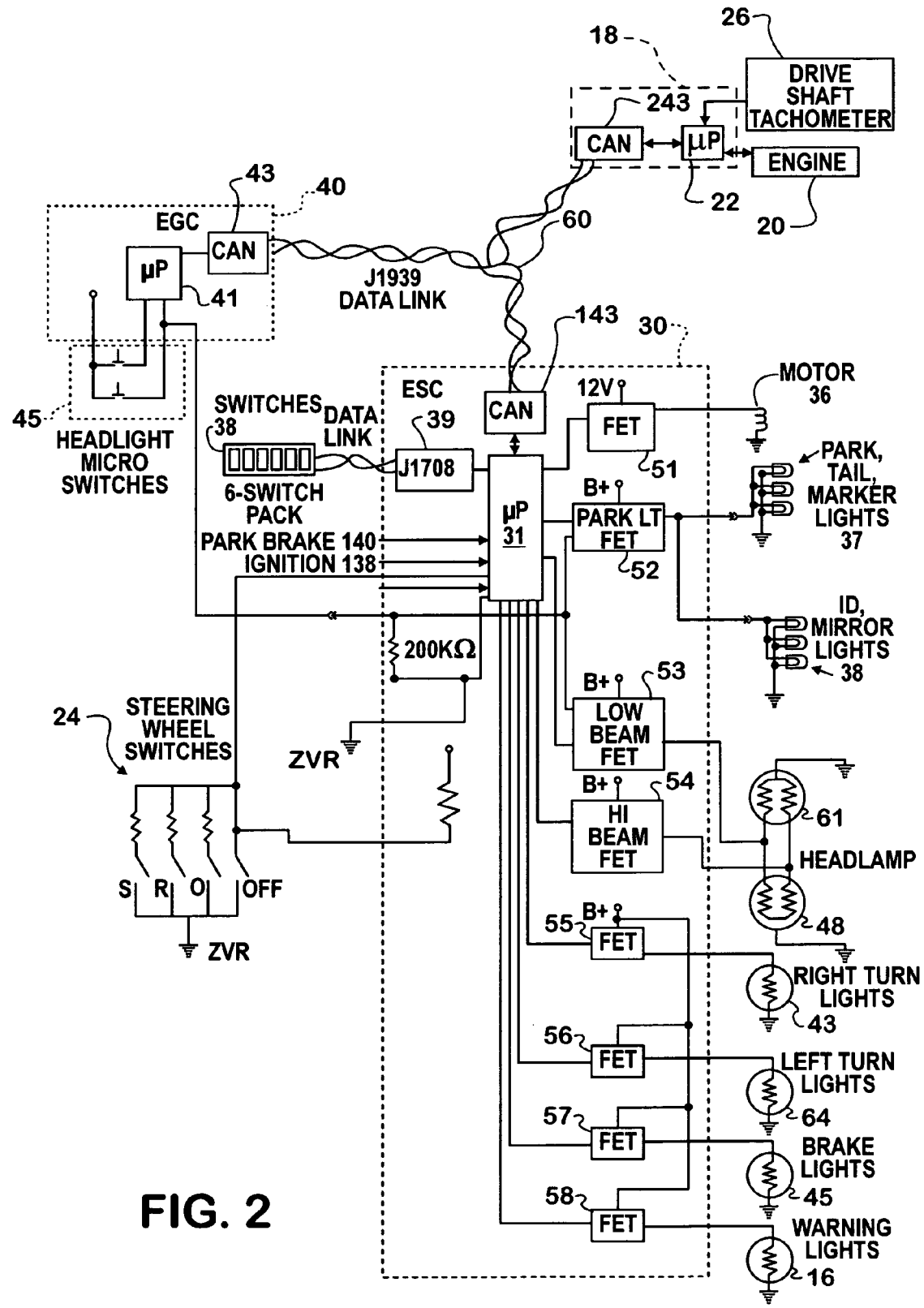
FIG. 2 is a mixed circuit schematic and block diagram of a electrical control system for a vehicle including lighting control.

Referring now to FIG. 2, a mixed circuit, block diagram schematic illustrates selected features of a vehicle electrical control system, including controllers 18, 40 for the engine and gauge cluster, as well as a more general electrical system controller (ESC) 30, a type of body computer. Each controller includes a programmed microprocessor, including microprocessor 22 for engine controller 18, microprocessor 41 for electrical gauge controller (EGC) 40 and microprocessor 31 for ESC 30. The engine controller 18 provides control over the operation of an engine 20, monitors engine operating variables and may be used to monitor drive shaft speed using a drive shaft tachometer 26 coupled to the drive shaft (not shown) at the transmission (not shown). The drive shaft tachometer 26 signal is used by the engine controller 18 to determine vehicle speed. Alternatively, vehicle speed may be determined by the ESC 30 where the drive shaft tachometer signal is passed by the engine controller 18 to the ESC. Other controllers may supply the vehicle speed signal as well. An example is an antilock brake controller (not shown) which can be used to determine vehicle speed from the average wheel rotational speeds. Electrical system controller 30 provides a number of general services, but in common vehicle control architectures, is charged with lighting system control.

The controllers communicate among one another over a bus or controller area network (CAN) conforming to the SEA J1939 standard. Each controller is provided with a controller area network (CAN) interface, including CAN interface 243 for the engine controller 18, CAN interface 43 for the electrical gauge controller (EGC) 40 and CAN interface 143 for the ESC 30. The microprocessors 22, 41, 31 are connected to the CAN interfaces 243, 43, 143, respectively, to implement communication over datalink 60. While much data is exchanged over the CAN datalink 60, such as head light microswitch 45 status for EGC 40, the particular data of interest here include a vehicle speed signal. The usual source for the vehicle speed signal is microprocessor 22 in the engine controller 18.

Datalink 60 is not the sole source of data received by ESC 30. ESC 30 is also connected to receive several switch inputs. One source of switch inputs is a switch pack 38, which is connected to ESC 30 over an SAE J1708 serial link through a J1708 interface 39. ESC 30 microprocessor 31 may also be connected to receive directly other switch inputs, such as those from an array of momentary steering wheel switches 24, a park brake position switch 140 and an ignition switch 138. The input activating pupil warning lights 16 may come from either switch pack 38 or from the steering wheel switch array 24.

ESC 30 microprocessor 31 controls a plurality of power switching field effect transistors (FETs) 51, 52, 53, 54, 55, 56, 57 and 58. Among these FETs are a low beam FET 53 which is employed to turn the low beam of the headlamps 48, 61 on and off. FET 51 is connected to drive a warning arm positioning motor 36, park light FET 52 is connected to drive assorted marker, park and tail lights 37, 38, FET 55 is connected to drive the right turn signal lamps 43, FET 56 is connected to drive left turn signal lamps 64, FET 57 is connected to drive the brake lamps 45 and FET 58 is connected to illuminate the pupil boarding warning lamps 16. The hazard lights comprise the left and right turn signal lights 43, 64, operated synchronously, by concurrent switching of FETs 53, 56. Hazard mode may be implemented using different sets of lights than the turn signals, for example, the rear brake lights may be used instead.

Microprocessor 31 is conventionally programmed as a microcontroller and the programming directs responses to various status indications and switch inputs, whether directly received, or decoded from messages broadcast over the controller area network, or received over other datalinks, such as a SAE J1708 serial datalink through datalink interface 39.

Because of the availability of status inputs from various sources to microprocessor 31, hazard operation of the turn signals can be closely tied to operating conditions inferred from the inputs. The particular inputs of interest here are vehicle speed and the status of the switch used to control pupil boarding warning lights 16. The invention, in its preferred embodiment, provides programming the microprocessor 31 to activate operation of the turn signal lights 43, 64 in hazard mode in response to activation of the pupil warning lights 16. Operation of the turn signal lights 43, 64 in hazard mode is cancelled in response to vehicle speed later exceeding a programmed maximum. This maximum speed is user selectable. Alternatively, the hazard mode could be activated in response to other conditions being met, such as setting the park brake 140 concurrently with or following activation of the pupil warning lights 16. Operation of the turn signal lights 43, 64 in hazard mode is also discontinued in response to deactivation of warning lights 16, detected by the microprocessor 31.

The present invention, in a preferred embodiment, simplifies school bus operation by automating activation and deactivation of the hazard feature for operation of the vehicle's exterior lights.

While the invention is shown in only one of its forms, it is not thus limited but is susceptible to various changes and modifications without departing from the spirit and scope of the invention.

What is claimed is:

1. A motor vehicle comprising:

exterior lighting including pupil warning lights and signaling lights operable in a flashing hazard mode;

a lighting control system including switching control for the exterior lighting;

a park brake position indication switch indicating setting of a park brake coupled to the lighting control system;

a vehicle speed measurement system coupled to supply speed measurement readings to the lighting control system; and a pupil warning light activation switch coupled to the lighting control system;

the lighting control system being responsive to operation of the pupil warning light activation switch, and, as a selectable option, setting of the park brake concurrently with or after operation of the pupil warning light activation switch for activating the signaling lights in hazard mode, and being further responsive to the vehicle speed measurement system for deactivating flashing hazard mode operation of the signaling lights upon vehicle speed exceeding a predetermined maximum.

* * * * *